US011236625B2

(12) United States Patent
Beyer et al.

(10) Patent No.: US 11,236,625 B2
(45) Date of Patent: Feb. 1, 2022

(54) METHOD OF MAKING A COOLED AIRFOIL ASSEMBLY FOR A TURBINE ENGINE

(71) Applicant: General Electric Company, Schenectady, NY (US)

(72) Inventors: Matthew Thomas Beyer, Hartland, WI (US); Gregory Terrence Garay, West Chester, OH (US)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 15/615,869

(22) Filed: Jun. 7, 2017

(65) Prior Publication Data
US 2018/0355728 A1  Dec. 13, 2018

(51) Int. Cl.
| F01D 9/02 | (2006.01) |
| B23P 15/02 | (2006.01) |
| F02C 6/12 | (2006.01) |

(52) U.S. Cl.
CPC .............. *F01D 9/023* (2013.01); *B23P 15/02* (2013.01); *F01D 9/026* (2013.01); *F02C 6/12* (2013.01); *F05D 2230/10* (2013.01)

(58) Field of Classification Search
CPC .......... F01D 9/023; F01D 9/026; F01D 5/189; F02C 6/12; B23P 15/02; B23P 15/04; B23P 9/00; B23P 2700/06; B22C 9/10; B22C 9/103; B22C 9/108; B22D 29/00; B22D 29/001; B22D 29/002
See application file for complete search history.

(56) References Cited

U.S. PATENT DOCUMENTS

| 6,190,130 | B1 * | 2/2001 | Fukue | F01D 5/187 416/97 R |
| 6,984,101 | B2 * | 1/2006 | Schiavo, Jr. | F01D 5/187 415/115 |
| 7,270,173 | B2 * | 9/2007 | Wiedemer | B22C 9/103 164/369 |
| 7,416,391 | B2 * | 8/2008 | Veltre | F01D 5/187 416/193 A |
| 8,070,421 | B2 * | 12/2011 | Dalton | F01D 9/041 415/115 |
| 8,356,978 | B2 | 1/2013 | Beattie et al. | |
| 8,734,108 | B1 | 5/2014 | Liang | |
| 8,851,846 | B2 * | 10/2014 | Ellis | F01D 5/081 416/193 A |
| 8,905,714 | B2 | 12/2014 | Ellis et al. | |

(Continued)

FOREIGN PATENT DOCUMENTS

CN  103184895 A  7/2013

OTHER PUBLICATIONS

Chinese Patent Office, Office Action re Corresponding Chinese Application No. 201810579899.5, dated May 6, 2020, 8 pages, China.

*Primary Examiner* — Sarang Afzali
(74) *Attorney, Agent, or Firm* — McGarry Bair PC

(57) ABSTRACT

A method for making a cooled component for a turbine engine includes casting an airfoil assembly having an airfoil with an airfoil cooling passage and extending from a platform with at least one platform cooling passage, and forming a connecting passage between the airfoil cooling air passage and the platform cooling air passage via a tool inserted into a breakout opening in a slashface of the platform.

22 Claims, 5 Drawing Sheets

(56) References Cited

U.S. PATENT DOCUMENTS

| | | |
|---|---|---|
| 9,051,838 B2 | 6/2015 | Wardle et al. |
| 9,080,452 B2 | 7/2015 | Boeke et al. |
| 9,249,674 B2 | 2/2016 | Ellis et al. |
| 9,303,518 B2 | 4/2016 | Willey et al. |
| 10,041,357 B2 * | 8/2018 | Hagan .................. F01D 5/18 |
| 10,352,182 B2 * | 7/2019 | Bergman ............... F01D 9/041 |
| 2012/0087803 A1 * | 4/2012 | Butler .................. F01D 5/186 |
| | | 416/97 R |
| 2015/0007581 A1 * | 1/2015 | Sezer .................. F01D 25/12 |
| | | 60/806 |
| 2015/0152735 A1 * | 6/2015 | Molter .................. F01D 5/20 |
| | | 416/97 R |
| 2015/0252673 A1 * | 9/2015 | VanTassel ............. B23P 15/02 |
| | | 416/97 R |
| 2016/0017720 A1 | 1/2016 | Lewis et al. |
| 2016/0222792 A1 | 8/2016 | King |
| 2016/0230567 A1 | 8/2016 | Gayman et al. |
| 2016/0305254 A1 | 10/2016 | Snyder et al. |

\* cited by examiner

METHOD OF MAKING A COOLED AIRFOIL ASSEMBLY FOR A TURBINE ENGINE

BACKGROUND OF THE INVENTION

Turbine engines, and particularly gas or combustion turbine engines, are rotary engines that extract energy from a flow of pressurized combusted gases passing through the engine onto a multitude of rotating turbine blades.

Turbine engines can be designed to operate at high temperatures to maximize efficiency, and suitable cooling of engine components can be beneficial for engine efficiency, longevity, and costs of operation.

BRIEF DESCRIPTION OF THE INVENTION

In one aspect, a method for making a cooled airfoil assembly for a turbine engine includes casting an airfoil assembly having an airfoil, with at least one airfoil cooling air passage, extending from a platform, with at least one platform cooling passage having a breakout opening in a slashface of the platform, forming a connecting passage between the airfoil cooling air passage and the platform cooling air passage by introducing a passage forming tool into the breakout opening, and closing the breakout opening.

In another aspect, a component for a turbine engine includes a platform having opposing upper and lower surfaces, with a side surface extending between the upper and lower surfaces, an airfoil extending from the upper surface and having an outer wall bounding an interior and defining a pressure side and a suction side extending axially between a leading edge to a trailing edge to define a chord-wise direction and extending radially between a root and a tip to define a span-wise direction, with the root being adjacent the platform, an airfoil cooling passage passing through the platform and into an interior of the airfoil, a platform cooling passage having an opening formed in the side surface, with a plug closing the opening, and a connecting passage coupling the airfoil cooling passage to the platform cooling passage at a location proximate the plug.

DESCRIPTION OF EMBODIMENTS OF THE INVENTION

Figure 1:
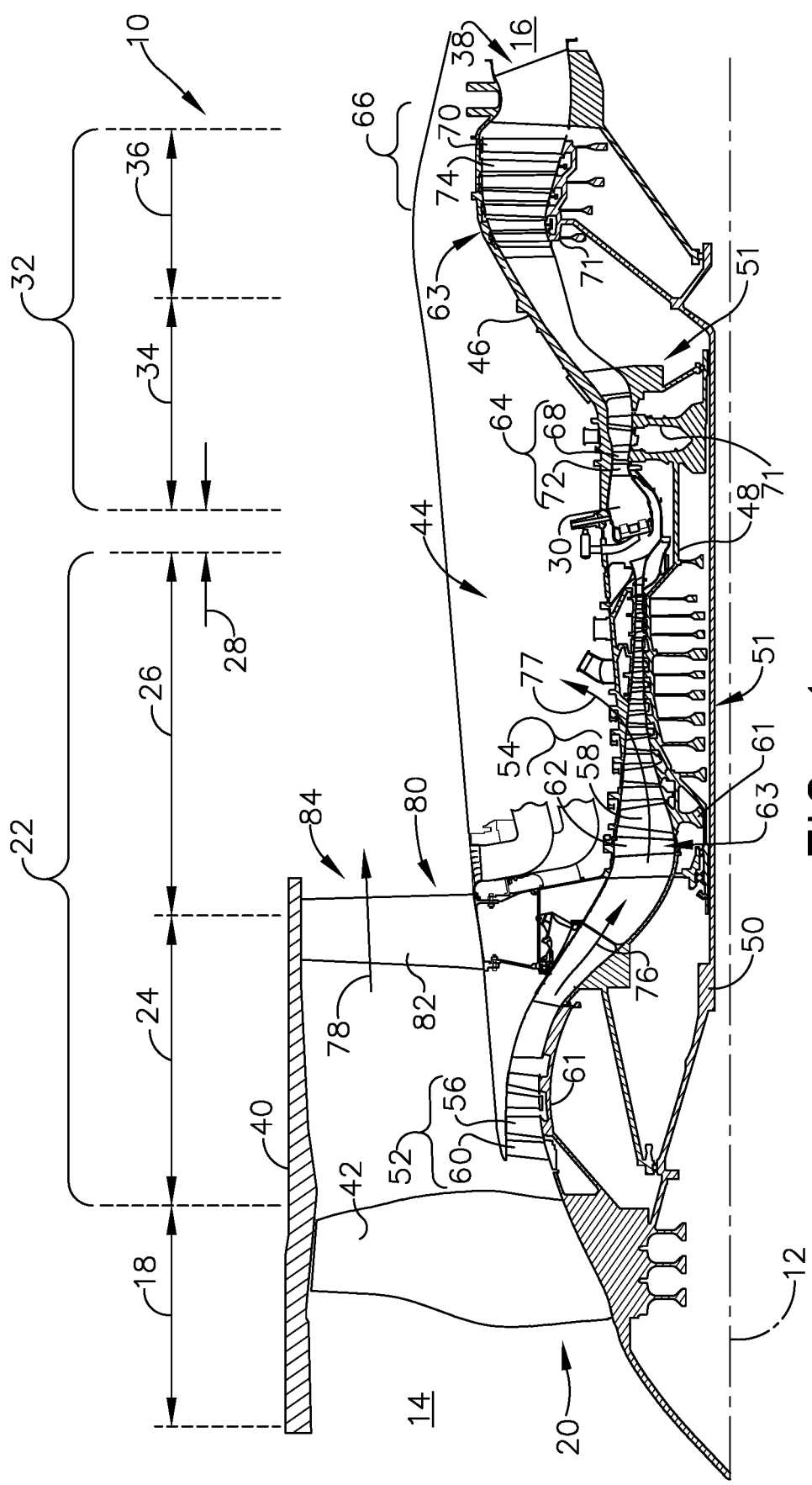
FIG. 1 is a schematic cross-sectional diagram of a turbine engine for an aircraft.

The described embodiments of the present disclosure are directed to a cooled airfoil assembly for a turbine engine. For purposes of illustration, the present disclosure will be described with respect to the turbine for an aircraft turbine engine. It will be understood, however, that the disclosure is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
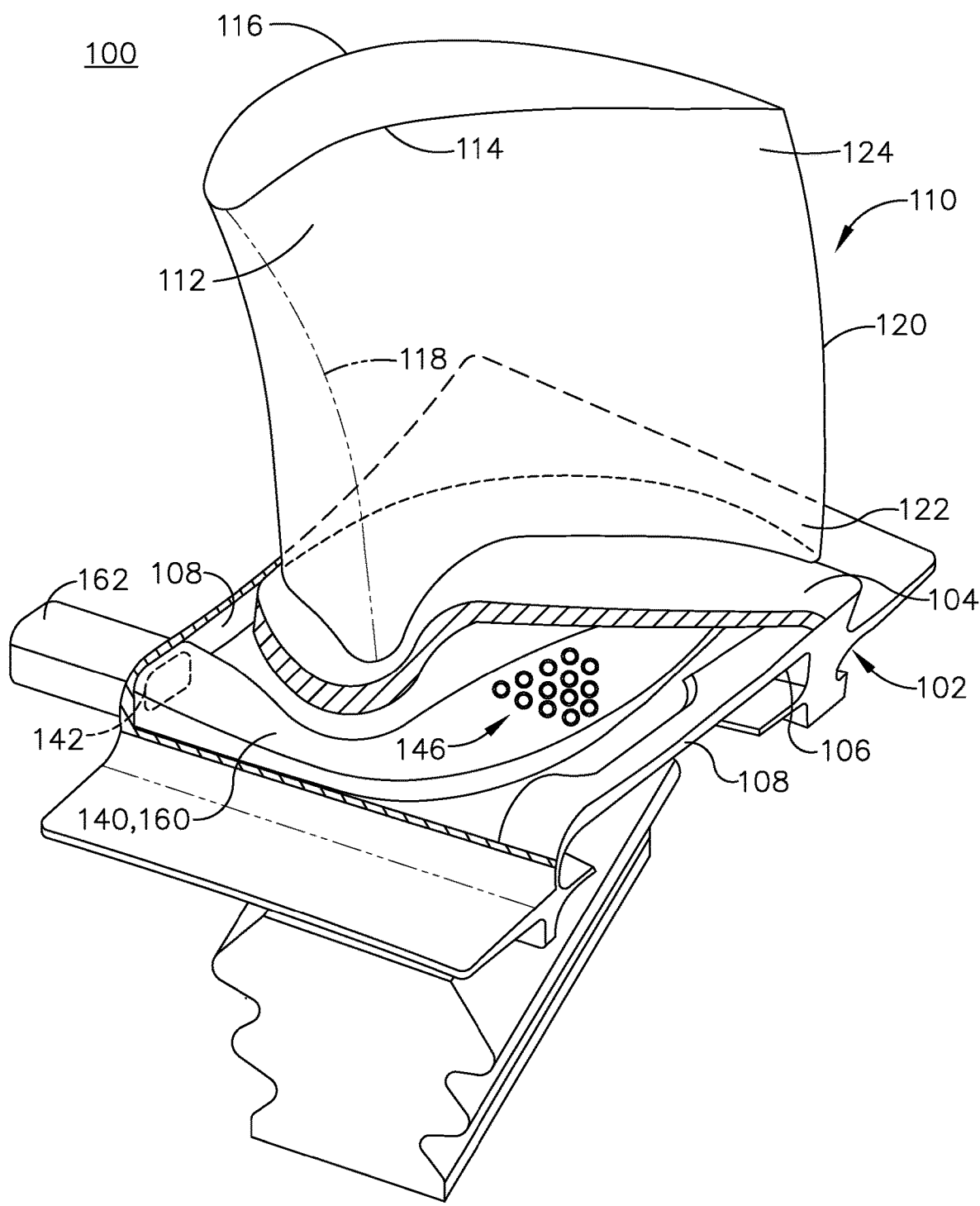
FIG. 2 is perspective view of an airfoil assembly in the turbine engine of FIG. 1 including a platform cooling passage with an opening.

In FIG. 2 a component for the engine 10 is illustrated herein as a cooled airfoil assembly 100 including a platform 102 having an upper surface 104, a lower surface 106 opposite the upper surface 104, and a side surface or slashface 108 extending between the upper and lower surfaces 104, 106. The airfoil assembly 100 can also include an airfoil 110 (such as the HP turbine blade 68) extending from the upper surface 104 with an outer wall 112 bounding an interior and defining a pressure side 114 and suction side 116. The airfoil 110 can extend axially between a leading edge 118 and trailing edge 120, defining a chord-wise direction. The airfoil 110 can also extend radially between a root 122 and a tip 124, defining a span-wise direction, with the root 122 adjacent the platform 102. It should be understood that the airfoil 110 can include any rotating or non-rotating airfoil in the compressors 24, 26 (FIG. 1), or turbines 34, 36 (FIG. 1), within the engine 10.

The platform 102 can further include a platform cooling air passage 140 having a breakout opening 142 formed in the slashface 108. The cooling passage 140 can at least partially wrap around the leading edge 118, extending in the chord-wise direction and along the pressure side 114 of the airfoil 110 as shown. It is also contemplated that a set of pins or turbulators 146 can be provided within the cooling passage 140 as desired. The platform cooling passage 140 can be formed using an investment core 160 having a printout 162, which will be described in further detail below.

Figure 3:
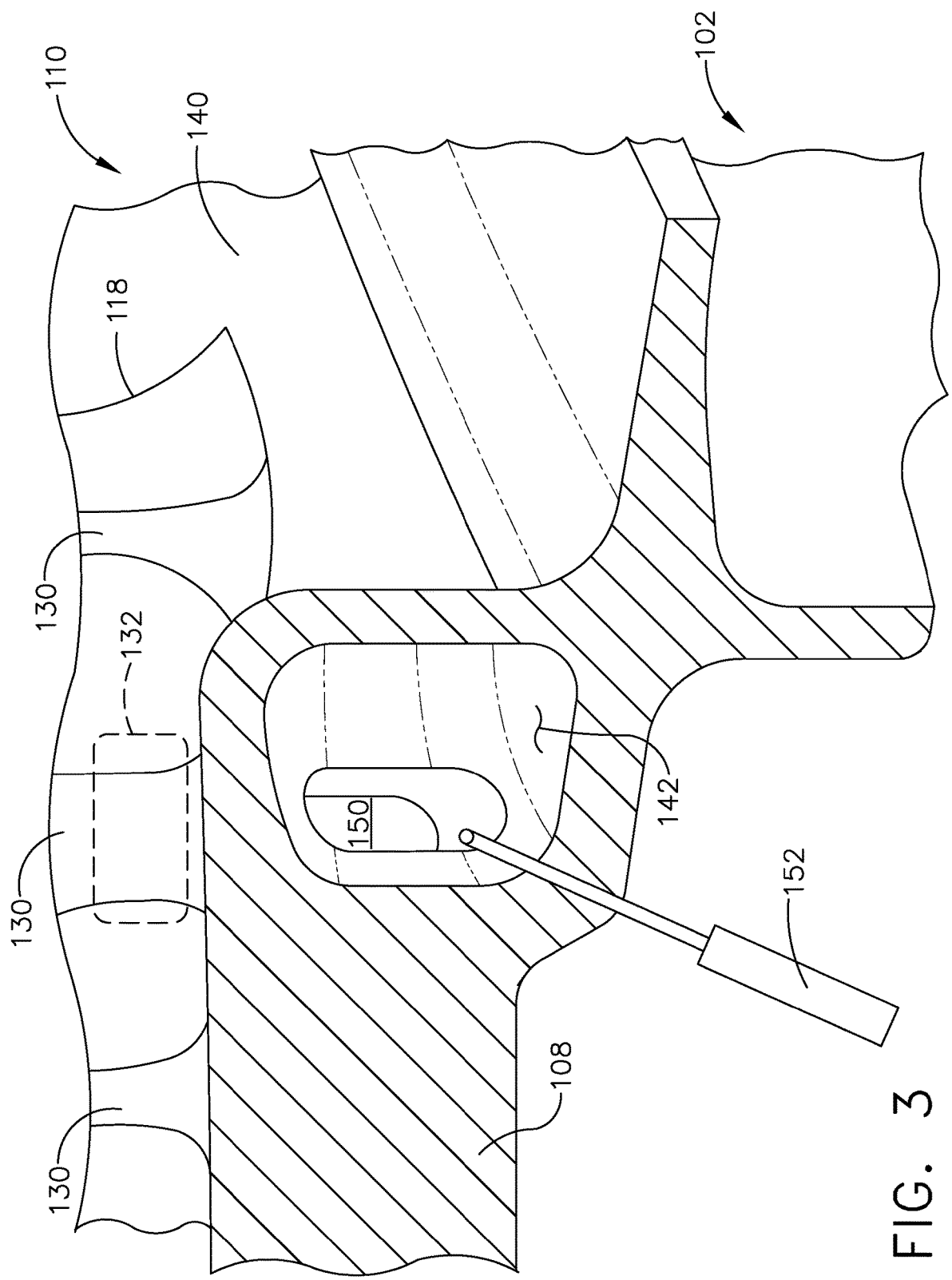
FIG. 3 is a perspective view of the airfoil assembly of FIG. 2 including an airfoil cooling passage and connecting passage.

Turning to FIG. 3, the airfoil 110 can further include at least one airfoil cooling air passage 130 passing through the platform 102 and into an interior of the airfoil 110. A portion 132 of the airfoil cooling passage 130 proximate the leading edge 118 can extend within the airfoil 110 in the span-wise direction. It is also contemplated that the airfoil cooling passage 130 can include multiple airfoil cooling passages 130 emanating from a common junction within the airfoil 110 as shown.

In addition, a connecting passage 150 can be formed coupling the airfoil cooling passage 130 and platform cooling passage 140 at a location proximate the breakout opening 142. It is contemplated that the connecting passage 150 can fluidly couple to the portion 132 of the airfoil cooling passage, or to a common junction of multiple airfoil cooling passages, in non-limiting examples.

Figure 4:
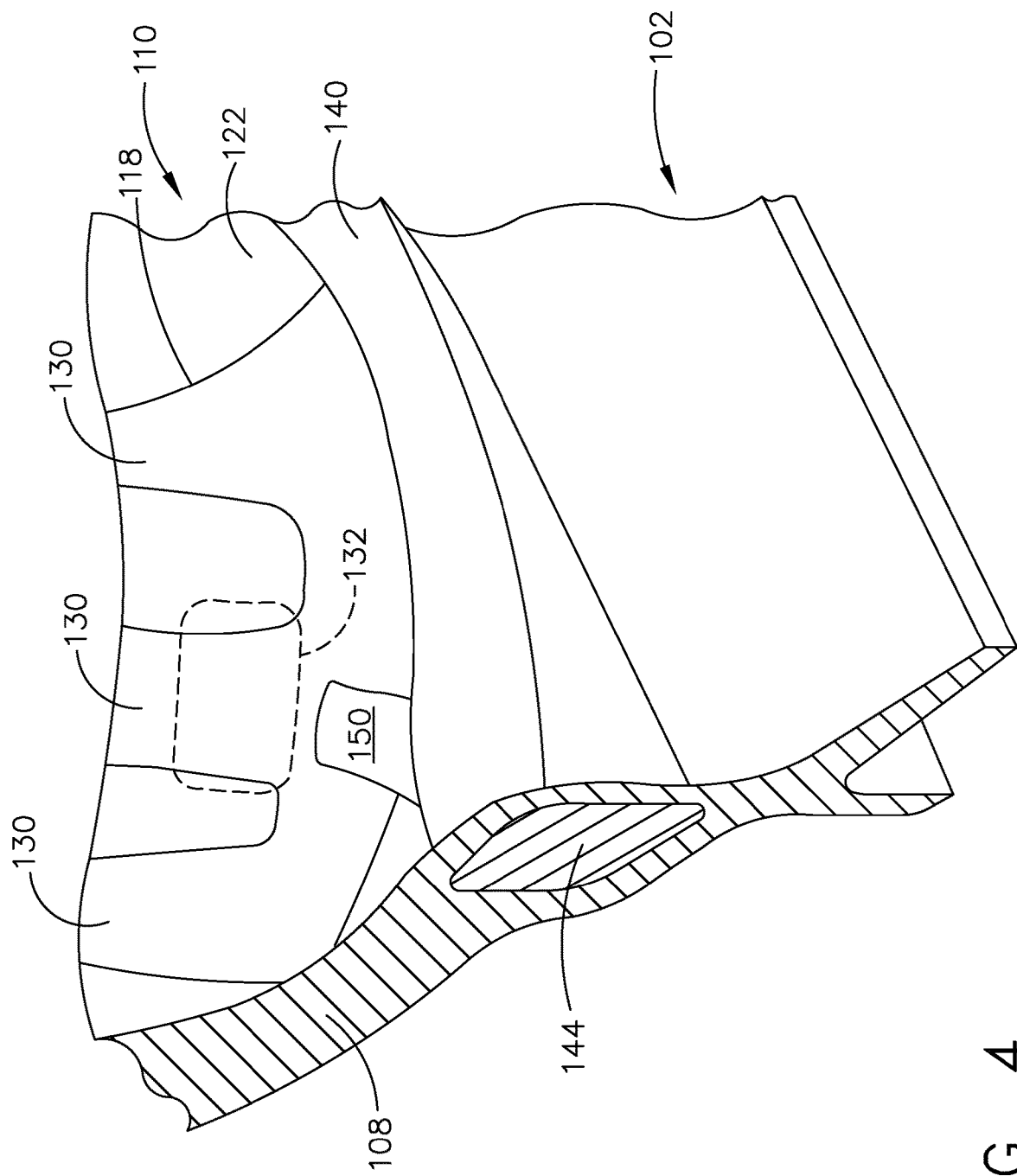
FIG. 4 is a perspective view of the airfoil assembly of FIG. 2 including a plug over the opening.

A plug 144 can be provided to close the breakout opening 142 as shown in FIG. 4. The airfoil cooling passage 130, platform cooling passage 140, and connecting passage 150 can be fluidly coupled, and the plug 144 can seal the passages 130, 140, 150 to contain cooling airflows within the airfoil assembly 100. In operation, cooling air from within the airfoil 110 can be supplied to the platform cooling passage 140 via the airfoil cooling passage 130 and connecting passage 150. In one example where multiple airfoil cooling passages 130 have a common junction, the connecting passage 150 can supply cooling air to the junction.

Figure 5:
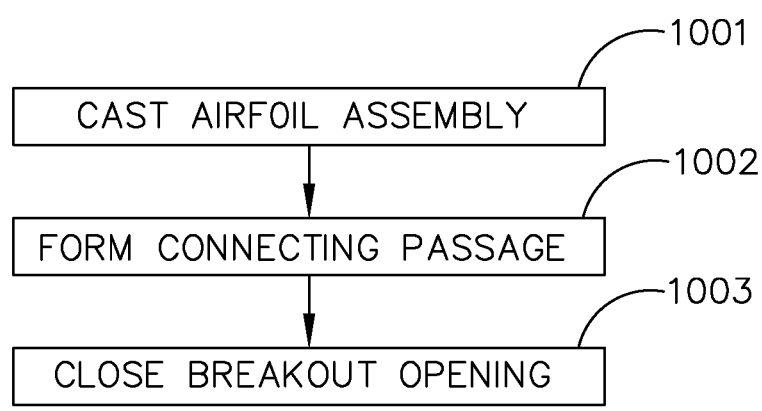
FIG. 5 is a flowchart illustrating a method of making a cooled airfoil.

A method for making the cooled airfoil 110 is illustrated in FIG. 5. At step 1001 the airfoil assembly 100 can be cast. During this step the investment core 160 (FIG. 2) can be formed within the platform 102 to partially define the platform cooling passage 140. The investment core 160 can include the printout 162 external to the slashface 108 as shown in FIG. 2. The printout 162 can be held by a suitable tool (not shown) in order to hold the investment core 160 during casting; it is also contemplated that a second printout can be formed on an opposite side of the slashface 108 to provide a second hold point during casting. The airfoil assembly 100 can be cast around the investment core 160, and the investment core 160 can be leached away to define the platform cooling passage 140 and breakout opening 142 in the slashface 108 as shown in FIG. 3.

At step 1002 a passage forming tool 152 can be introduced into the breakout opening 142 to form the connecting passage 150 (FIGS. 3-4) between the airfoil cooling passage 130 and platform cooling passage 140. In a non-limiting example where the passage forming tool 152 comprises a drill bit, it is contemplated that the connecting passage 150 can be formed by drilling into a wall of the platform cooling passage 140. In other examples the passage forming tool can also comprise a laser beam, EDM electrode, or any other suitable tool for forming the passage 150.

At step 1003 the breakout opening 142 can be closed. In one example the plug 144 can be brazed within the opening 142, and it is also contemplated that the plug 144 can be plated or inserted into the opening 142 in non-limiting examples. After closing the breakout opening 142, the slashface 108 and plug 144 can be finished by grinding or other suitable processes such that the plug 144 is positioned flush with the slashface 108.

It can be appreciated that aspects of the present disclosure provide for a variety of benefits. Cooling air can be supplied into the platform cooling passage 140 from any desired cavity within the airfoil 110 via the connecting passage 150. In addition, the breakout opening 142 can be large enough to allow use of the forming tool 152 to form the connecting passage 150, which can limit the need to drill through external walls of the airfoil assembly 110 and improve structural integrity of the assembly 110. When assembling multiple airfoil assemblies 100 in a stage of the turbine engine 10, adjacent slashfaces 108 between adjacent airfoil assemblies 100 can contact one another and aid in securing the plugs 144. Further, the use of finishing after inserting the plug 144 can provide more manufacturing tolerance during the casting process as the plug 144 can extend outward beyond the slashface 108 by any desired extent before finishing. Additionally, locating the printout 162 outside the slashface 108 can provide a substantially large area to stabilize the investment core 160 during the investment casting process.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of making a cooled airfoil assembly for a turbine engine, the method comprising:
    casting an airfoil assembly having an airfoil extending from a platform, an airfoil cooling air passage, and a platform cooling air passage having a breakout opening in a slashface of the platform;
    inserting a tool into the breakout opening and forming a connecting passage through a wall of the platform cooling air passage and into the airfoil cooling air passage via the tool, thereby fluidly coupling the airfoil cooling air passage and the platform cooling air passage; and
    closing the breakout opening.

2. The method of claim 1 wherein the casting comprises forming an investment core with a printout forming the platform cooling air passage and the breakout opening.

3. The method of claim 2 wherein the casting further comprises holding a portion of the printout to hold the investment core during casting.

4. The method of claim 3 wherein the casting further comprises leaching away the investment core.

5. The method of claim 1, further comprising finishing the slashface after the closing of the breakout opening.

6. The method of claim 5 wherein the finishing comprises grinding the slashface.

7. The method of claim 1 wherein the casting comprises wrapping the platform cooling air passage around a leading edge of the airfoil.

8. The method of claim 7 further comprising extending the platform cooling air passage along a pressure side of the airfoil.

9. The method of claim 1 wherein inserting the tool into the breakout opening comprises at least one of emitting a laser beam into the breakout opening, inserting an electrical discharge machining electrode into the breakout opening, or inserting a drill bit into the breakout opening.

10. The method of claim 1 wherein inserting the tool into the breakout opening comprises inserting a drill bit into the breakout opening and drilling the connecting passage.

11. The method of claim 1 wherein the closing the breakout opening comprises at least one of plating, brazing, welding, or plugging the breakout opening.

12. The method of claim 1 wherein the closing the breakout opening comprises brazing a plug within the breakout opening.

13. The method of claim 1 wherein the closing the breakout opening comprises plating a plug over the breakout opening.

14. A method of making a cooled airfoil assembly for a turbine engine, the method comprising:
    casting an airfoil assembly having an airfoil extending from a platform, an airfoil cooling air passage, and a platform cooling air passage having a breakout opening in a surface of the platform; and
    inserting a tool into the breakout opening and forming a connecting passage through a wall of the platform cooling air passage and into the airfoil cooling air passage via the tool, thereby fluidly coupling the airfoil cooling air passage and the platform cooling air passage.

15. The method of claim 14 wherein the casting comprises forming an investment core with a printout forming the platform cooling air passage and the breakout opening.

16. The method of claim 15 wherein the casting further comprises holding a portion of the printout to hold the investment core during casting.

17. The method of claim 16 wherein the casting further comprises leaching away the investment core.

18. The method of claim 14, further comprising closing the breakout opening.

19. The method of claim 18 wherein closing the breakout opening comprises brazing a plug within the breakout opening.

20. The method of claim 14 wherein the surface comprises a slashface of the platform.

21. The method of claim 14 wherein inserting the tool comprises at least one of emitting a laser beam into the breakout opening, inserting an electrical discharge machining electrode into the breakout opening, or inserting a drill bit into the breakout opening.

22. The method of claim 14 wherein inserting the tool comprises inserting a drill bit into the breakout opening and drilling the connecting passage through the wall.

* * * * *